United States Patent
Nakasaka (10) Patent No.: US 9,482,163 B2
(45) Date of Patent: Nov. 1, 2016

(54) SPARK IGNITION TYPE INTERNAL COMBUSTION ENGINE

(75) Inventor: Yukihiro Nakasaka, Suntou-gun (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 151 days.

(21) Appl. No.: 14/115,021

(22) PCT Filed: May 2, 2011

(86) PCT No.: PCT/JP2011/060895
§ 371 (c)(1),
(2), (4) Date: Oct. 31, 2013

(87) PCT Pub. No.: WO2012/150639
PCT Pub. Date: Nov. 8, 2012

(65) Prior Publication Data
US 2014/0053808 A1 Feb. 27, 2014

(51) Int. Cl.
*F02D 41/00* (2006.01)
*F02D 13/02* (2006.01)
*F02P 5/152* (2006.01)
(Continued)

(52) U.S. Cl.
CPC ............ *F02D 41/00* (2013.01); *F02B 75/041* (2013.01); *F02D 13/0238* (2013.01); *F02D 13/0269* (2013.01); *F02D 15/04* (2013.01); *F02D 35/024* (2013.01); *F02D 35/026* (2013.01); *F02D 35/028* (2013.01); *F02P 5/152* (2013.01); *F02D 35/023* (2013.01); *F02D 35/025* (2013.01); *Y02T 10/142* (2013.01); *Y02T 10/46* (2013.01)

(58) Field of Classification Search
CPC .... F02D 41/00; F02D 35/023; F02D 35/025; F02D 35/028; F02D 13/0238; F02D 13/0269; Y02T 10/14; Y02T 10/142

USPC ............ 123/406.16, 406.17, 406.19, 406.2, 123/406.21, 406.22, 406.55, 435, 90.15, 123/90.16, 347; 701/111; 73/114.16, 73/114.17
See application file for complete search history.

(56) References Cited

U.S. PATENT DOCUMENTS 2,226,298 A * 12/1940 Wellman ................. C10L 1/232
44/333
6,843,208 B2 * 1/2005 Tamura ................. F02M 43/00
123/1 A
(Continued)

FOREIGN PATENT DOCUMENTS

EP 1473452 A2 11/2004
JP 2004-332584 A 11/2004
(Continued)

OTHER PUBLICATIONS

International Search Report for PCT/JP2011/060895, dated Jun. 14, 2011.

*Primary Examiner* — Stephen K Cronin
*Assistant Examiner* — Kevin R Steckbauer
(74) *Attorney, Agent, or Firm* — Sughrue Mion, PLLC (57) ABSTRACT

In the present spark ignition internal combustion engine, a shortest self-ignition delay time τmin for a maximum cylinder internal pressure Pmax and a maximum cylinder internal temperature Tmax when equivolume combustion is realized is calculated by using a calculation formula which uses a cylinder internal pressure and a cylinder internal temperature to calculate an self-ignition delay time, and a knock limit ignition timing ITA is determined based on the calculated shortest self-ignition delay time.

2 Claims, 10 Drawing Sheets

(51) Int. Cl.
  *F02D 15/04*   (2006.01)
  *F02B 75/04*   (2006.01)
  *F02D 35/02*   (2006.01)

(56) References Cited

U.S. PATENT DOCUMENTS

| | | | | |
|---|---|---|---|---|
| 6,941,907 | B2* | 9/2005 | Dixon | F02B 1/12 |
| | | | | 123/48 A |
| 6,999,866 | B2* | 2/2006 | Noda | F02D 35/026 |
| | | | | 123/406.29 |
| 7,021,286 | B2* | 4/2006 | Yoshino | F02D 35/025 |
| | | | | 123/406.29 |
| 7,222,606 | B2* | 5/2007 | Yoshino | F02P 5/152 |
| | | | | 123/406.37 |
| 7,949,471 | B2* | 5/2011 | Ritz | G01N 33/2829 |
| | | | | 702/11 |
| 8,646,312 | B2* | 2/2014 | Ritz | G01N 33/2829 |
| | | | | 702/11 |
| 8,771,385 | B2* | 7/2014 | Griffins | C10G 2/30 |
| | | | | 44/424 |
| 2004/0220720 | A1* | 11/2004 | Noda | F02D 35/026 |
| | | | | 701/111 |
| 2005/0188954 | A1* | 9/2005 | Yoshino | F02D 35/025 |
| | | | | 123/406.29 |
| 2005/0268886 | A1 | 12/2005 | Etou et al. | |
| 2006/0107924 | A1 | 5/2006 | Miyanoo et al. | |
| 2007/0255487 | A1 | 11/2007 | Etou et al. | |
| 2011/0061628 | A1* | 3/2011 | Fujita | F02D 35/023 |
| | | | | 123/406.47 |
| 2011/0079194 | A1* | 4/2011 | Tanaka | F02D 41/3035 |
| | | | | 123/295 |
| 2013/0080030 | A1* | 3/2013 | Chi | F02D 41/401 |
| | | | | 701/103 |
| 2013/0080083 | A1* | 3/2013 | Chi | F01N 9/005 |
| | | | | 702/50 |
| 2013/0192561 | A1* | 8/2013 | Hasegawa | F02D 41/04 |
| | | | | 123/435 |
| 2014/0303874 | A1* | 10/2014 | Sasaki | F02D 41/064 |
| | | | | 701/104 |
| 2015/0322372 | A1* | 11/2015 | Gao | C10L 1/1905 |
| | | | | 508/409 |

FOREIGN PATENT DOCUMENTS

| | | | |
|---|---|---|---|
| JP | 2005-233111 A | 9/2005 | |
| JP | 2005-344650 A | 12/2005 | |
| JP | 2007-170345 A | 7/2007 | |
| JP | 2008-95553 A | 4/2008 | |
| JP | 2008-95593 A | 4/2008 | |
| JP | 2009-264258 A | 11/2009 | |
| JP | 2010-285873 A | 12/2010 | |
| JP | 2011-21552 A | 2/2011 | |
| KR | 20050006754 A * | 1/2005 | ............ F02P 5/152 |

\* cited by examiner

SPARK IGNITION TYPE INTERNAL COMBUSTION ENGINE

CROSS REFERENCE TO RELATED APPLICATIONS

This application is a National Stage of International Application No. PCT/JP2011/060895 filed May 2, 2011, the contents of all of which are incorporated herein by reference in their entirety.

TECHNICAL FIELD

The present invention relates to a spark ignition type internal combustion engine.

BACKGROUND ART

In a spark ignition internal combustion engine, it is required that knocking does not occur. For this reason, it has been proposed to predict if knocking will occur in the current combustion cycle and, if necessary, retard the forced-ignition timing (see PLT 1).

To predict if knocking will occur, a Livengood-Wu integral which uses a formula for calculating the self-ignition delay time using the pressure and time in the cylinder as variables and considers the changes in the self-ignition delay time along with time is employed. That is, it is assumed that self-ignition occurs in the cylinder at the time when the time integral value of the reciprocal of the self-ignition delay time becomes 1, it is predicted that knocking will not occur if the combustion is completed before the timing at which the time integral value becomes 1 (all fuel in the cylinder burns), and it is predicted that knocking will occur if the combustion is not completed at the timing at which the time integral value becomes 1.

CITATIONS LIST

Patent Literature

PLT 1: Japanese Patent Publication No. 2004-332584 A
PLT 2: Japanese Patent Publication No. 2011-021552 A
PLT 3: Japanese Patent Publication No. 2010-285873 A
PLT 4: Japanese Patent Publication No. 2007-170345 A
PLT 5: Japanese Patent Publication No. 2008-095553 A

SUMMARY OF INVENTION

Technical Problem

As explained above, it is possible to predict the occurrence of knocking, but in a Livengood-Wu integral which uses a formula for calculating the self-ignition delay time using the pressure and time in the cylinder as variables, a massive calculation time is required. Not only that, it is difficult to accurately estimate the pressure and temperature in the cylinder at each timing from the start of combustion due to forced-ignition. As a result, it is difficult to accurately calculate the self-ignition delay time at each timing after ignition so as to accurately calculate the timing at which the time integral value of the reciprocal of the self-ignition delay time will become 1. Due to this, with a Livengood-Wu integral, good forced-ignition timing control not allowing the occurrence of knocking becomes difficult to realize.

Therefore, an object of the present invention is to provide a spark ignition internal combustion engine which enables good forced-ignition timing control not allowing the occurrence of knocking without using a Livengood-Wu integral.

Solution to Problem

The spark ignition internal combustion engine as set forth in claim 1 according to the present invention is characterized in that into a calculation formula, which uses a cylinder internal pressure and a cylinder internal temperature to calculate an self-ignition delay time, a maximum cylinder internal pressure and maximum cylinder internal temperature when equivolume combustion is realized are entered so as to calculate a shortest self-ignition delay time and a knock limit forced-ignition timing is determined based on the calculated shortest self-ignition delay time.

The spark ignition internal combustion engine as set forth in claim 2 according to the present invention provides the spark ignition internal combustion engine as set forth in claim 1 characterized in that before determining said knock limit forced-ignition timing, correction is performed so that the smaller a combustion chamber volume at compression top dead center by a variable compression ratio mechanism, the longer the shortest self-ignition delay time becomes.

Advantageous Effects of Invention

According to the spark ignition internal combustion engine as set forth in claim 1 according to the present invention, a shortest self-ignition delay time for a maximum cylinder internal pressure and a maximum cylinder internal temperature when equivolume combustion is realized is calculated by using a calculation formula which uses a cylinder internal pressure and a cylinder internal temperature to calculate the self-ignition delay time, and a knock limit forced-ignition timing is determined based on the calculated shortest self-ignition delay time. The shortest self-ignition delay time for a maximum cylinder internal pressure and a maximum cylinder internal temperature when equivolume combustion is realized is a value which includes the amount of intake air, the actual compression ratio, and all other variable factors and which expresses the ease of occurrence of knocking in the current combustion cycle. Due to this, good forced-ignition timing control which uses the shortest self-ignition delay time as the basis to determine the knock limit forced-ignition timing and thereby prevents the occurrence of knocking without using a time integral of the reciprocal of the self-ignition delay time, that is, a Livengood-Wu integral, becomes possible.

According to the spark ignition internal combustion engine as set forth in claim 2 according to the present invention, there is provided the spark ignition internal combustion engine as set forth in claim 1 wherein the smaller the combustion chamber volume at compression top dead center is made by a variable compression ratio mechanism, the greater the change in the combustion chamber volume per unit time in the expansion stroke, so in the expansion stroke, the cylinder internal pressure and cylinder internal temperature rapidly fall and knocking becomes difficult to occur, and therefore before determining the knock limit forced-ignition timing, the shortest self-ignition delay time expressing the ease of occurrence of knocking is corrected to become longer. Due to this, it is possible to determine the more suitable knock limit forced-ignition timing for the current combustion cycle.

DESCRIPTION OF EMBODIMENTS

Figure 1:
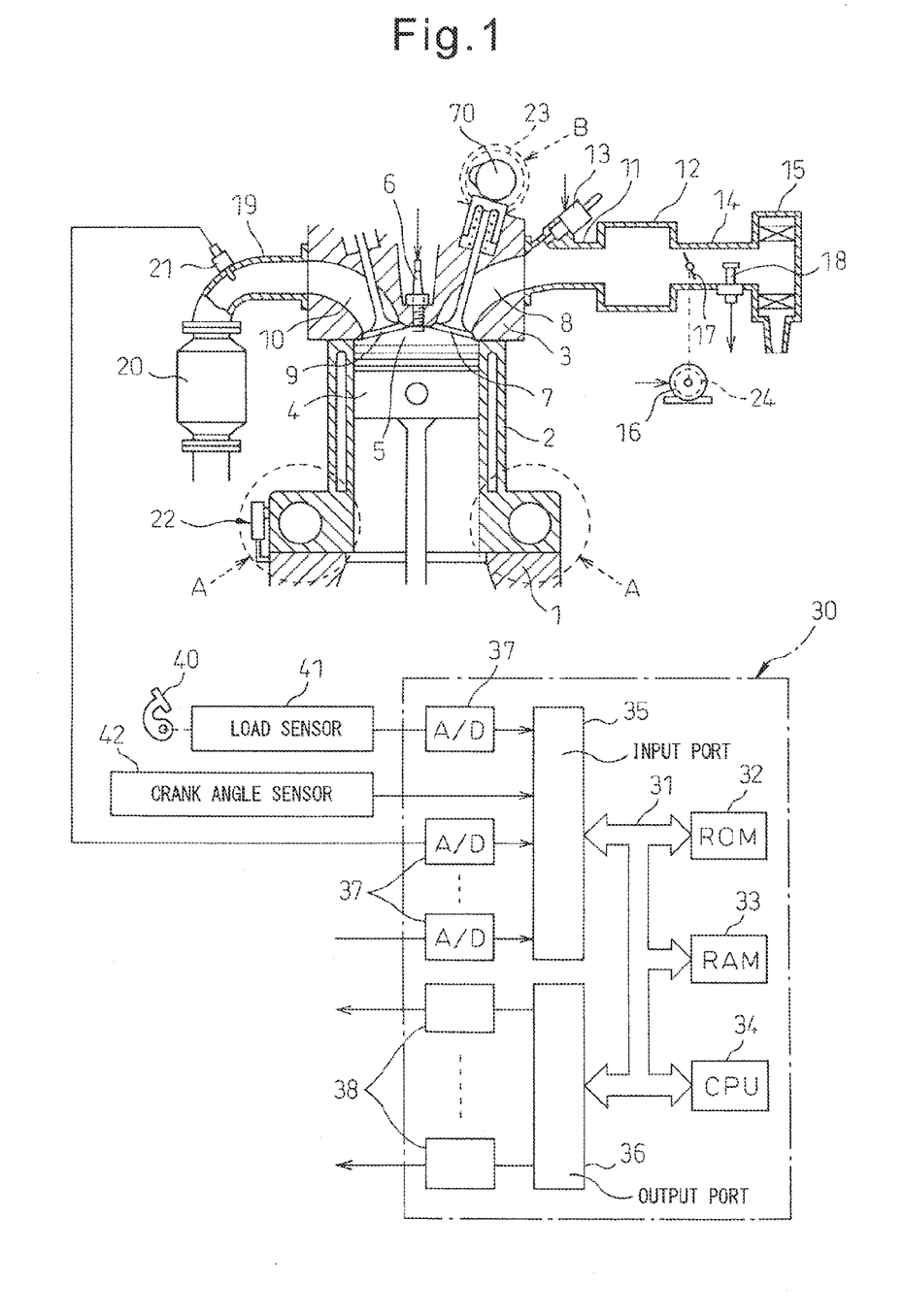
FIG. 1 is an overview of a spark ignition type internal combustion engine.

FIG. 1 shows a side cross-sectional view of a spark ignition type internal combustion engine according to the present invention. Referring to FIG. 1, 1 indicates a crankcase, 2 a cylinder block, 3 a cylinder head, 4 a piston, 5 a combustion chamber, 6 a spark plug arranged at the top center of a combustion chamber 5, 7 an intake valve, 8 an intake port, 9 an exhaust valve, and 10 an exhaust port. Each intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected through an intake duct 14 to an air cleaner 15, while the intake duct 14 is provided inside it with a throttle valve 17 which is driven by an actuator 16 and an intake air amount detector 18 which uses for example a hot wire. On the other hand, the exhaust port 10 is connected through an exhaust manifold 19 to a catalytic device 20 which houses for example a three-way catalyst, while the exhaust manifold 19 is provided inside it with an air-fuel ratio sensor 21.

On the other hand, in the embodiment shown in FIG. 1, the connecting part of the crankcase 1 and the cylinder block 2 is provided with a variable compression ratio mechanism A which is able to change the relative positions of the crankcase 1 and cylinder block 2 in the cylinder axial direction so as to change the volume of the combustion chamber 5 when the piston 4 is positioned at compression top dead center and is further provided with an actual compression action start timing changing mechanism B which is able to change a start timing of an actual compression action. Note that in the embodiment shown in FIG. 1, this actual compression action start timing changing mechanism B is comprised of a variable valve timing mechanism which is able to control the closing timing of the intake valve 7.

As shown in FIG. 1, the crankcase 1 and the cylinder block 2 have a relative position sensor 22 attached to them to detect the relative positional relationship between the crankcase 1 and the cylinder block 2. From the relative position sensor 22, an output signal which shows the change in the interval between the crankcase 1 and the cylinder block 2 is output. Further, the variable valve timing mechanism B has a valve timing sensor 23 attached to it so as to generate an output signal which shows the closing timing of the intake valve 7, while the actuator 16 for driving the throttle valve has a throttle opening degree sensor 24 attached to it so as to generate an output signal which shows the throttle valve opening degree.

The electronic control unit 30 is comprised of a digital computer which is provided with components connected with each other through a bidirectional bus 31 such as a ROM (read only memory) 32, RAM (random access memory) 33, CPU (microprocessor) 34, input port 35, and output port 36. The output signals of the intake air amount detector 18, the air-fuel ratio sensor 21, the relative position sensor 22, the valve timing sensor 23, and the throttle opening degree sensor 24 are input through corresponding AD converters 37 to the input port 35. Further, the accelerator pedal 40 is connected to a load sensor 41 which generates an output voltage proportional to the amount of depression L of the accelerator pedal 40. The output voltage of the load sensor 41 is input through a corresponding AD converter 37 to the input port 35. Further, the input port 35 is connected to a crank angle sensor 42 which generates an output pulse every time the crankshaft rotates by for example 30°. On the other hand, the output port 36 is connected through a corresponding drive circuit 38 to spark plugs 6, fuel injectors 13, throttle valve drive actuator 16, variable compression ratio mechanism A, and variable valve timing mechanism B.

Figure 2:
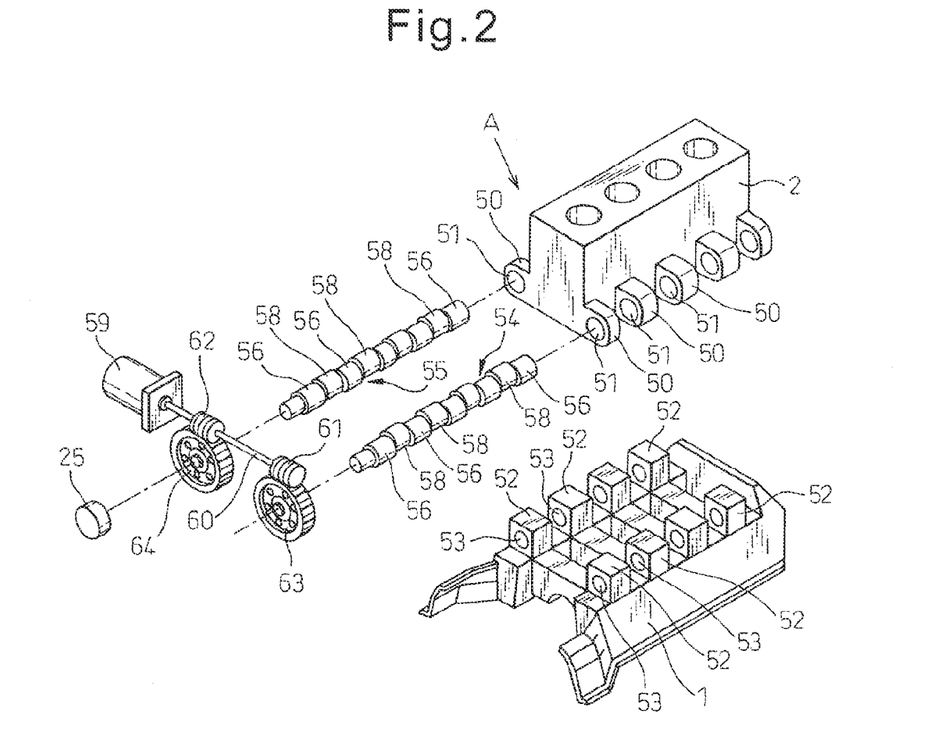
FIG. 2 is a disassembled perspective view of a variable compression ratio mechanism.
Figure 3:
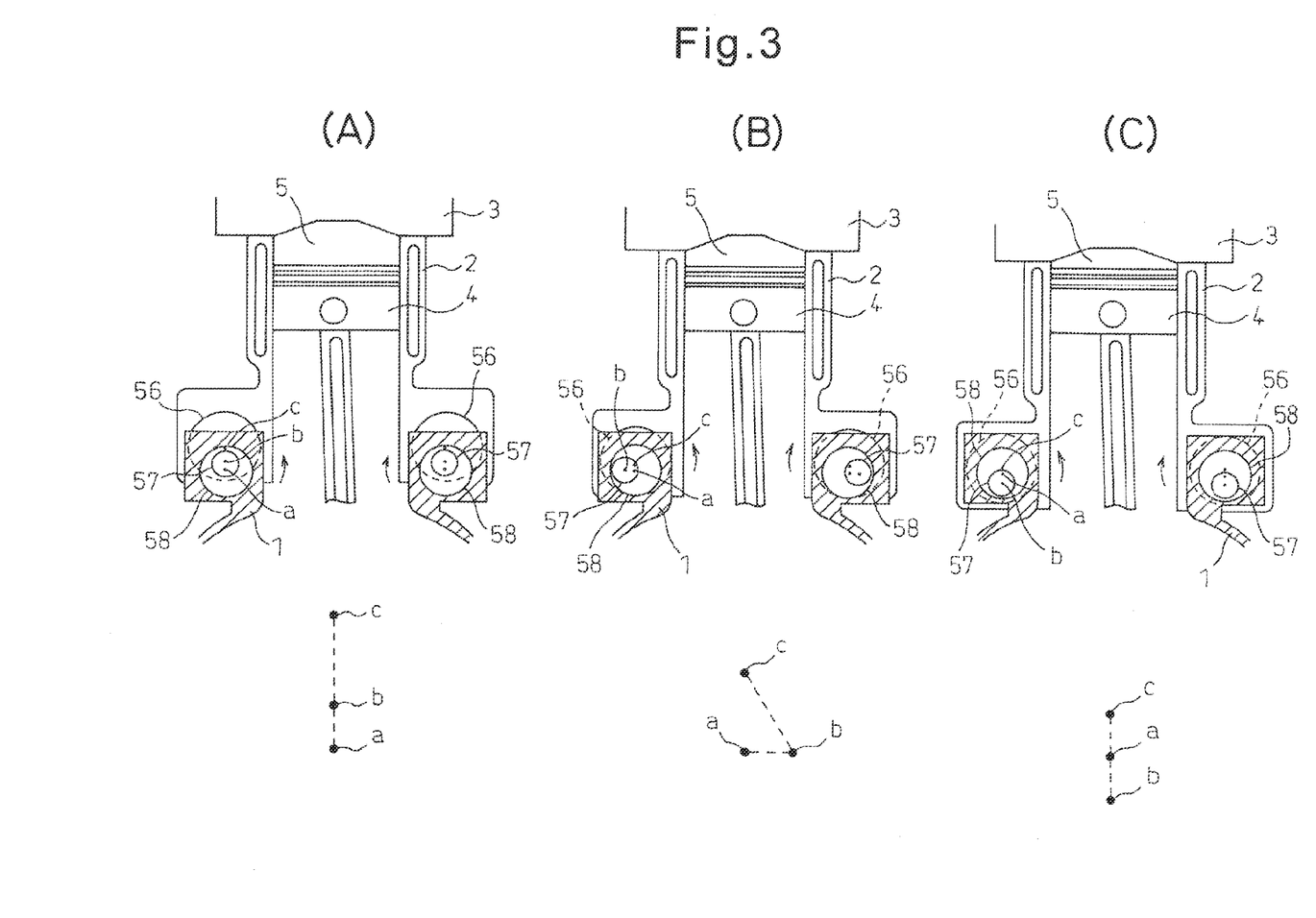
FIG. 3 is a side cross-sectional view of the illustrated internal combustion engine.

FIG. 2 is a disassembled perspective view of the variable compression ratio mechanism A which is shown in FIG. 1, while FIG. 3 is a side cross-sectional view of the illustrated internal combustion engine. Referring to FIG. 2, at the bottom of the both side walls of the cylinder block 2, a plurality of projecting parts 50 which are separated from each other by a certain distance are formed. Each projecting part 50 is formed with a circular cross-section cam insertion hole 51. On the other hand, the top surface of the crankcase 1 is formed with a plurality of projecting parts 52 which are separated from each other by a certain distance and which fit between the corresponding projecting parts 50. These projecting parts 52 are also formed with circular cross-section cam insertion holes 53.

As shown in FIG. 2, a pair of cam shafts 54 and 55 are provided. On each of the cam shafts 54 and 55, circular cams 58 inserted into the cam insertion holes 53 so as to be able to rotate in the cam insertion holes 53 are fixed at every other position. These circular cams 58 are coaxial with the rotation axes of the cam shafts 54 and 55. On the other hand, at the two sides of each circular cam 58, as shown in FIG. 3, extend eccentric shafts 57 arranged eccentrically with respect to the rotation axes of the cam shafts 54 and 55. Each eccentric shaft 57 has other circular cams 56 rotatably attached to it eccentrically. As shown in FIG. 2, these circular cams 56 are arranged at the two sides of circular cams 58. These circular cams 56 are rotatably inserted in the corresponding cam insertion holes 51. Further, as shown in FIG. 2, the cam shaft 55 has a cam rotational angle sensor 25 attached to it so as to generate an output signal which shows the rotational angle of the cam shaft 55.

When the circular cams 58 which are fastened to the cam shafts 54, 55 are rotated in opposite directions as shown by the arrows in FIG. 3(A) from the state shown in FIG. 3(A), the eccentric shafts 57 move in directions separating from each other, and therefore the circular cams 56 rotate in the opposite directions from the circular cams 58 in the cam insertion holes 51. As shown in FIG. 3(B), the positions of the eccentric shafts 57 change from a high position to a medium position. Next, if making the circular cams 58 rotate further in the direction shown by the arrow, as shown in FIG. 3(C), the eccentric shafts 57 become the lowest position.

Note that, FIG. 3(A), FIG. 3(B), and FIG. 3(C) show the positional relationship of the centers "a" of the circular cams 58, the centers "b" of the eccentric shafts 57, and the centers "c" of the circular cams 56 in the respective states.

As will be understood from a comparison of FIG. 3(A) and FIG. 3(C), the relative positions of the crankcase 1 and cylinder block 2 are determined by the distance between the centers "a" of the circular cams 58 and the centers "c" of the circular cams 56. The larger the distance between the centers "a" of the circular cams 58 and the centers "c" of the circular cams 56, the further the cylinder block 2 from the crankcase 1. That is, the variable compression ratio mechanism A uses a crank mechanism using rotating cams so as to change the relative positions between the crankcase 1 and the cylinder block 2. If the cylinder block 2 separates from the crankcase 1, the volume of a combustion chamber 5 when the piston 4 is positioned at compression top dead center increases, therefore by making the cam shafts 54 and 55 rotate, the volume of a combustion chamber 5 when the piston 4 is positioned at compression top dead center can be changed.

As shown in FIG. 2, to make the cam shafts 54 and 55 rotate in opposite directions, the shaft of a drive motor 59 is provided with a pair of worm gears 61 and 62 with opposite thread directions. Worm wheels 63 and 64 engaging with these worm gears 61 and 62 are fastened to ends of the cam shafts 54 and 55. In this embodiment, the drive motor 59 may be driven to change the volume of the combustion chamber 5 when the piston 4 is positioned at compression top dead center, over a broad range.

Figure 4:
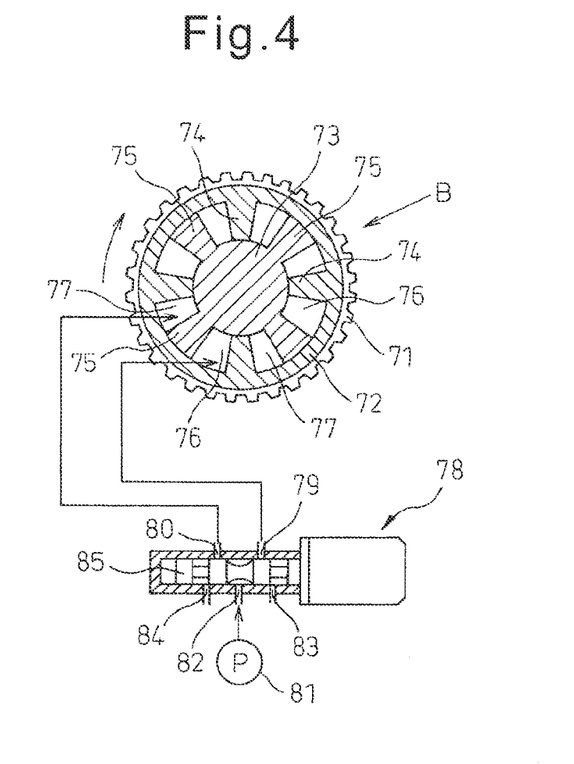
FIG. 4 is a view showing a variable valve timing mechanism.

On the other hand, FIG. 4 shows a variable valve timing mechanism B which is attached to the end of a cam shaft 70 for driving the intake valve 7 in FIG. 1. Referring to FIG. 4, this variable valve timing mechanism B is provided with a timing pulley 71 which is rotated by an engine crankshaft through a timing belt in the arrow direction, a cylindrical housing 72 which rotates together with the timing pulley 71, a shaft 73 which is able to rotate together with an intake valve drive cam shaft 70 and to rotate relative to the cylindrical housing 72, a plurality of partitions 74 which extend from an inside circumference of the cylindrical housing 72 to an outside circumference of the shaft 73, and vanes 75 which extend between the partitions 74 from the outside circumference of the shaft 73 to the inside circumference of the cylindrical housing 72, the two sides of the vanes 75 formed with advancing hydraulic chambers 76 and retarding hydraulic chambers 77.

The feed of working oil to the hydraulic chambers 76 and 77 is controlled by a working oil feed control valve 78. This working oil feed control valve 78 is provided with hydraulic ports 79 and 80 which are connected to the hydraulic chambers 76 and 77, a feed port 82 for working oil which is discharged from a hydraulic pump 81, a pair of drain ports 83 and 84, and a spool valve 85 for controlling connection and disconnection of the ports 79, 80, 82, 83, and 84.

To advance the phase of the cams of the intake valve drive cam shaft 70, in FIG. 4, the spool valve 85 is moved to the right, working oil which is fed from the feed port 82 is fed through the hydraulic port 79 to the advancing hydraulic chambers 76, and working oil in the retarding hydraulic chambers 77 is drained from the drain port 84. At this time, the shaft 73 is rotated relative to the cylindrical housing 72 in the arrow direction.

As opposed to this, to retard the phase of the cams of the intake valve drive cam shaft 70, in FIG. 4, the spool valve 85 is moved to the left, working oil fed from the feed port 82 is fed through the hydraulic port 80 to the retarding hydraulic chambers 77, and working oil in the advancing hydraulic chambers 76 is drained from the drain port 83. At this time, the shaft 73 is rotated relative to the cylindrical housing 72 in the direction opposite to the arrows.

When the shaft 73 is rotated relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the variable valve timing mechanism B so as to advance or retard the phase of the cams of the intake valve drive cam shaft 70 by exactly the desired amount.

Figure 5:
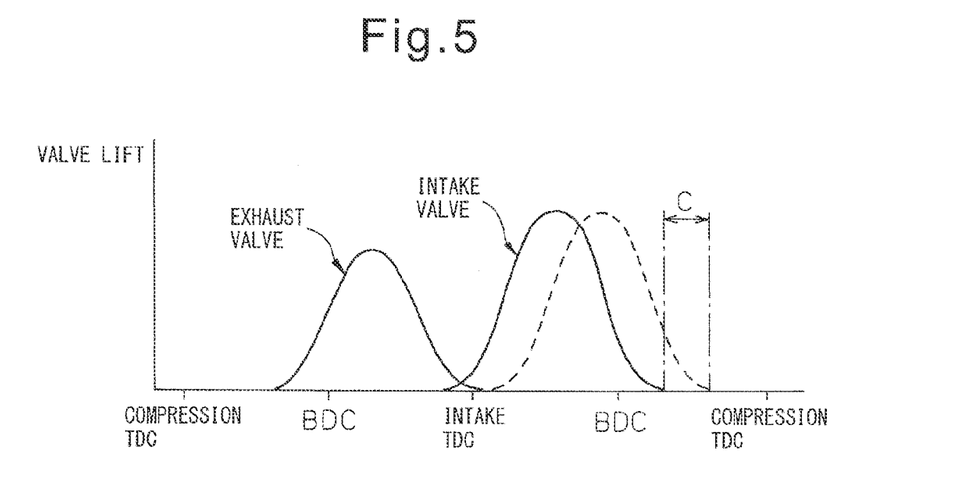
FIG. 5 is a view which shows the amounts of lift of the intake valve and exhaust valve.

In FIG. 5, the solid line shows when the phase of the cams of the intake valve drive cam shaft 70 is advanced the most by the variable valve timing mechanism B, while the broken line shows when the phase of the cams of the intake valve drive cam shaft 70 is retarded the most by the variable valve timing mechanism B. Therefore, the opening period of the intake valve 7 can be freely set between the range which is shown by the solid line in FIG. 5 and the range which is shown by the broken line, therefore the closing timing of the intake valve 7 can be set to any crank angle in the range which is shown by the arrow C in FIG. 5.

The variable valve timing mechanism B which is shown in FIG. 1 and FIG. 4 is one example. For example, a variable valve timing mechanism which are able to change only the closing timing of the intake valve while maintaining the opening timing of the intake valve constant, or other various types of variable valve timing mechanisms, can be used.

Figure 6:
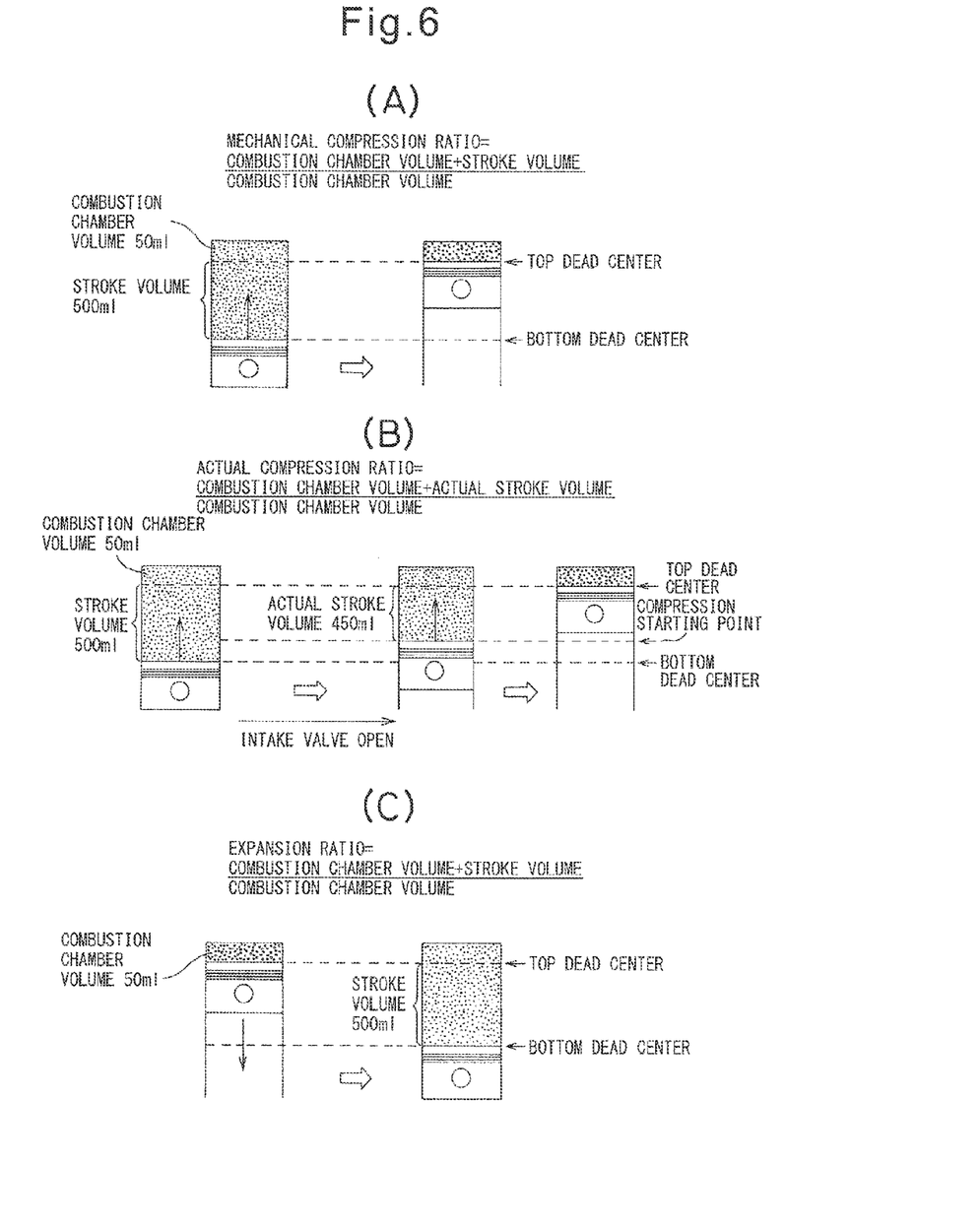
FIG. 6 is a view for explaining the mechanical compression ratio, actual combustion ratio, and expansion ratio.

Next, the meaning of the terms used in the present application will be explained with reference to FIG. 6. Note that FIGS. 6(A), (B), and (C) show for explanatory purposes an engine with a volume of the combustion chambers of 50 ml and a stroke volume of the piston of 500 ml. In these FIGS. 6(A), (B), and (C), the combustion chamber volume shows the volume of the combustion chamber when the piston is at compression top dead center.

FIG. 6(A) explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 6(A), this mechanical compression ratio becomes (50 ml+500 ml)/50 ml=11.

FIG. 6(B) explains the actual combustion ratio. This actual combustion ratio is a value determined from the actual stroke volume of the piston from when the compression action is actually started to when the piston reaches top dead center, and the combustion chamber volume. This actual combustion ratio is expressed by (combustion chamber volume+actual stroke volume)/combustion chamber volume. That is, as shown in FIG. 6(B), even if the piston starts to rise in the compression stroke, no compression action is performed while the intake valve is opened. The actual compression action is started after the intake valve closes. Therefore, the actual combustion ratio is expressed as above using the actual stroke volume. In the example shown in FIG. 6(B), the actual combustion ratio becomes (50 ml+450 ml)/50 ml=10.

FIG. 6(C) explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 6(C), this expansion ratio becomes (50 ml+500 ml)/50 ml=11.

Next, the superhigh expansion ratio cycle which is used in the present invention will be explained with reference to FIG. 7 and FIG. 8. Note that FIG. 7 shows the relationship between the theoretical thermal efficiency and the expansion ratio, while FIG. 8 shows a comparison between the ordinary cycle and superhigh expansion ratio cycle which are used selectively in accordance with the load in the present invention.

FIG. 8(A) shows the ordinary cycle when the intake valve closes near the bottom dead center and the compression action by the piston is started from near substantially intake bottom dead center. In the example shown in this FIG. 8(A) as well, in the same way as the examples shown in FIGS. 6(A), (B), and (C), the combustion chamber volume is 50 ml, and the stroke volume of the piston is 500 ml. As will be understood from FIG. 8(A), in an ordinary cycle, the mechanical compression ratio is (50 ml+500 ml)/50 ml=11, the actual combustion ratio is also about 11, and the expansion ratio also becomes (50 ml+500 ml)/50 ml=11. That is, in an ordinary internal combustion engine, the mechanical compression ratio and actual combustion ratio and the expansion ratio become substantially equal.

Figure 7:
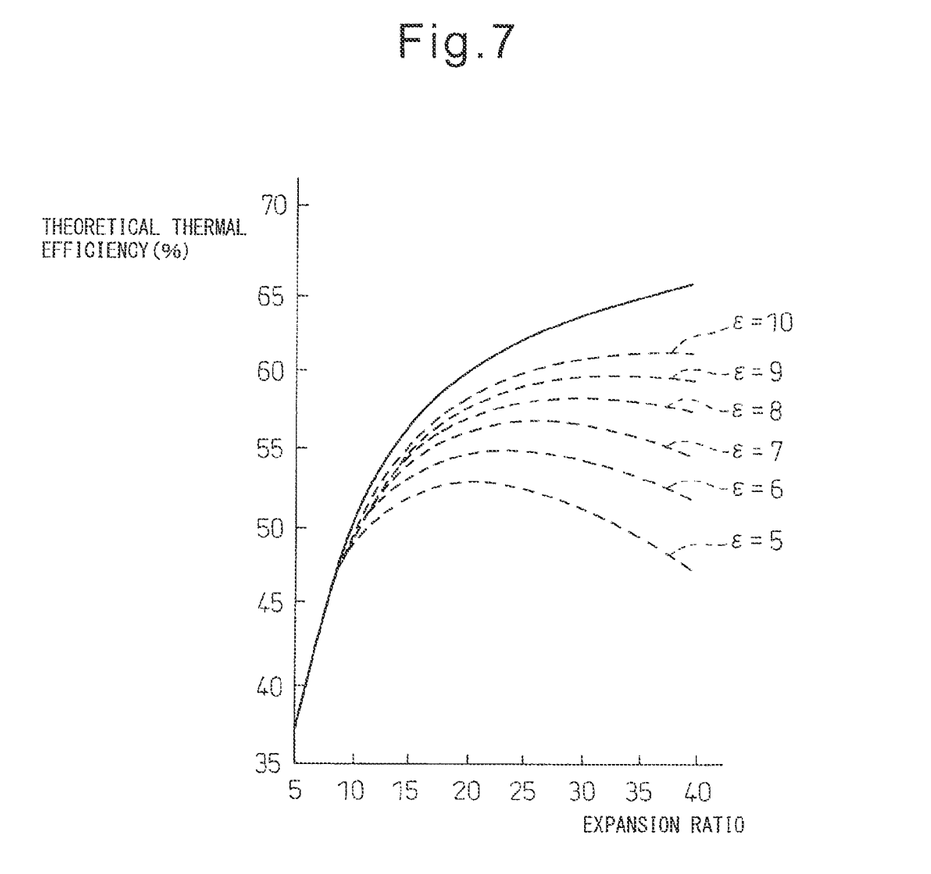
FIG. 7 is a view which shows the relationship between the theoretical thermal efficiency and expansion ratio.
Figure 8:
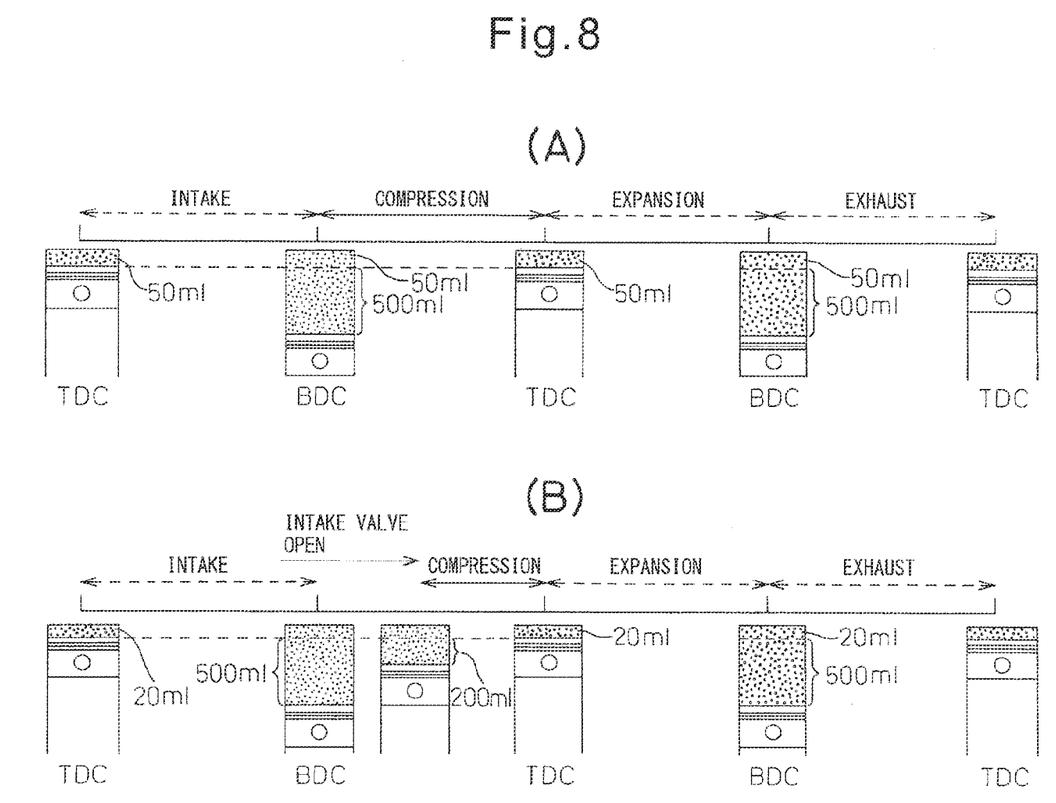
FIG. 8 is a view for explaining an ordinary cycle and superhigh expansion ratio cycle.

The solid line in FIG. 7 shows the change in the theoretical thermal efficiency in the case where the actual combustion ratio and expansion ratio are substantially equal, that is, in the ordinary cycle. In this case, it is learned that the larger the expansion ratio, that is, the higher the actual combustion ratio, the higher the theoretical thermal efficiency. Therefore, in an ordinary cycle, to raise the theoretical thermal efficiency, the actual combustion ratio should be made higher. However, due to the restrictions on the occurrence of knocking at the time of engine high load operation, the actual combustion ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual combustion ratio and studied raising the theoretical thermal efficiency and as a result discovered that in the theoretical thermal efficiency, the expansion ratio is dominant, and the theoretical thermal efficiency is not affected much at all by the actual combustion ratio. That is, if raising the actual combustion ratio, the explosive force rises, but compression requires a large energy, accordingly even if raising the actual combustion ratio, the theoretical thermal efficiency will not rise much at all.

As opposed to this, if increasing the expansion ratio, the longer the period during which a force acts pressing down the piston at the time of the expansion stroke, and thus the longer the time that the piston gives a rotational force to the crankshaft. Therefore, the larger the expansion ratio is made, the higher the theoretical thermal efficiency becomes. The broken line $\epsilon=10$ in FIG. 7 shows the theoretical thermal efficiency in the case of fixing the actual combustion ratio at 10 and raising the expansion ratio in that state. In this way, it is learned that the amount of rise of the theoretical thermal efficiency when raising the expansion ratio $\epsilon$ in the state where the actual combustion ratio is maintained at a low value and the amount of rise of the theoretical thermal efficiency in the case where the actual combustion ratio is increased along with the expansion ratio as shown by the solid line of FIG. 7 will not differ that much.

If the actual combustion ratio is maintained at a low value in this way, knocking will not occur, therefore if raising the expansion ratio in the state where the actual combustion ratio is maintained at a low value, the occurrence of knocking can be prevented and the theoretical thermal efficiency can be greatly raised. FIG. 8(B) shows an example of the case when using the variable compression ratio mechanism A and the variable valve timing mechanism B to maintain the actual combustion ratio at a low value and raise the expansion ratio.

Referring to FIG. 8(B), in this example, the variable compression ratio mechanism A is used to lower the combustion chamber volume from 50 ml to 20 ml. On the other hand, the variable valve timing mechanism B is used to retard the closing timing of the intake valve until the actual stroke volume of the piston changes from 500 ml to 200 ml. As a result, in this example, the actual combustion ratio becomes (20 ml+200 ml)/20 ml=11 and the expansion ratio becomes (20 ml+500 ml)/20 ml=26. In the ordinary cycle shown in FIG. 8(A), as explained above, the actual combustion ratio is about 11 and the expansion ratio is 11. Compared with this case, in the case shown in FIG. 8(B), it is learned that only the expansion ratio is raised to 26. This will be called the "superhigh expansion ratio cycle" below.

Generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8(B), the actual stroke volume of the piston at the time of the compression stroke is becomes smaller, and therefore the amount of intake air which can be sucked into the combustion chamber 5 becomes smaller. Accordingly, this superhigh expansion ratio cycle can only be employed when the engine load is relatively low. Therefore, in this embodiment of the present invention, when the engine low load is relatively low, the superhigh expansion ratio cycle which is shown in FIG. 8(B) is set, while at the time of engine high load operation, the ordinary cycle which is shown in FIG. 8(A) is set.

Figure 9:
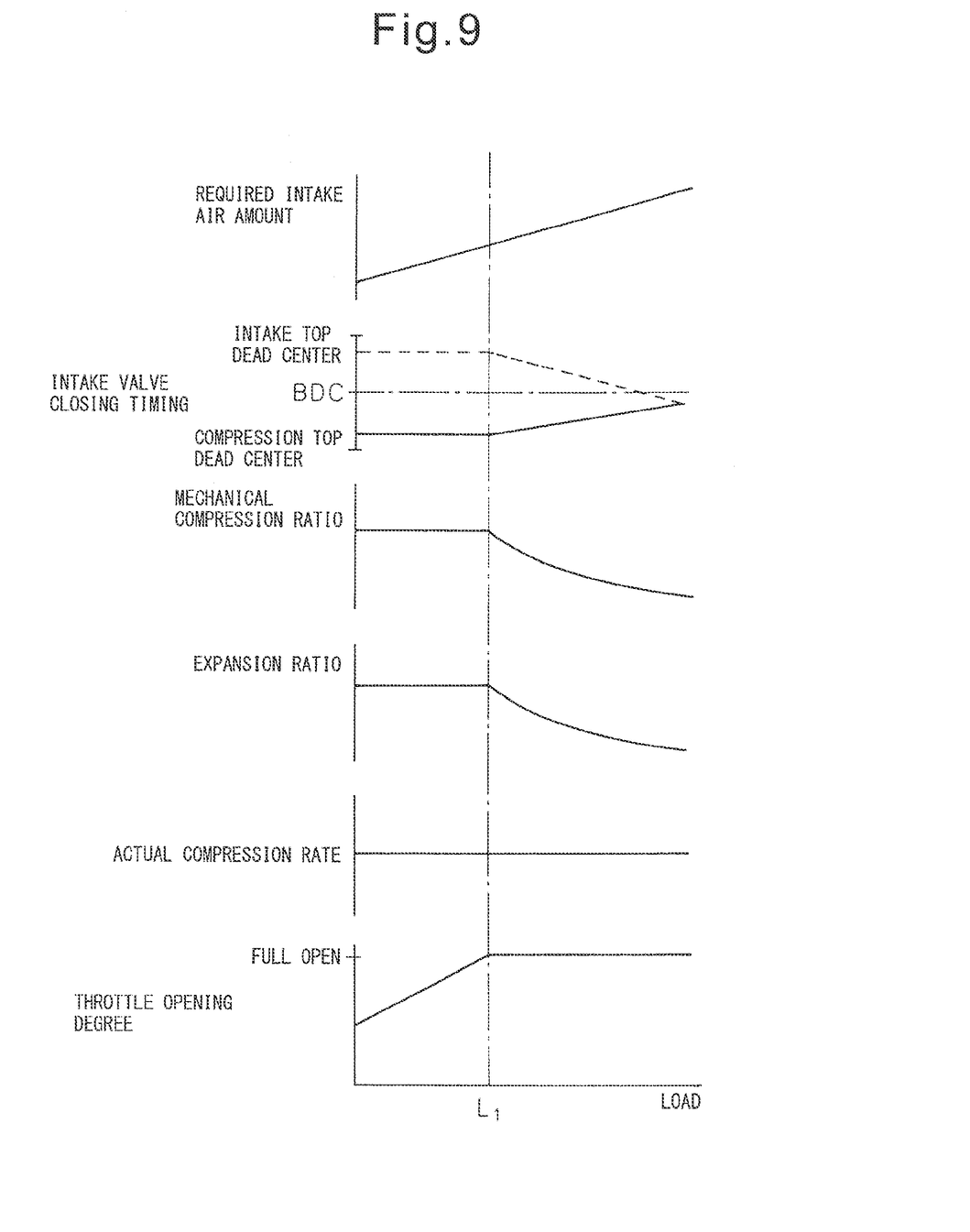
FIG. 9 is a view which shows the change in mechanical compression ratio etc. in accordance with the engine torque.

Next, referring to FIG. 9, the overall operational control will be briefly explained. FIG. 9 shows the changes, depending on the engine load, in the amount of intake air, the closing timing of the intake valve, the mechanical compression ratio, the expansion ratio, the actual compression ratio, and the opening degree of the throttle valve 17 at a certain engine speed. Note that FIG. 9 shows the case where the average air-fuel ratio in the combustion chamber 5 is feedback controlled to the stoichiometric air-fuel ratio based on the output signal of the air-fuel ratio sensor 21 so that the three-way catalyst in the catalytic device 20 can simultaneously reduce the unburned HC, CO, and $NO_X$ in the exhaust gas.

Now, as explained above, at the time of engine high load operation, the ordinary cycle shown in FIG. 8(A) is executed. Therefore, as shown in FIG. 9, at this time, since the mechanical compression ratio is low, the expansion ratio becomes low. As shown by the solid line in FIG. 9, the closing timing of the intake valve 7 is advanced as shown by the solid line in FIG. 5. Further, at this time, the amount of intake air is large. At this time, the opening degree of the throttle valve 17 is maintained full open, and therefore the pumping loss becomes zero.

On the other hand, as shown by the solid line in FIG. 9, if the engine load becomes low, along with this the closing timing of the intake valve 7 is retarded so as to reduce the amount of intake air. Further, at this time, the mechanical compression ratio is increased as the engine load becomes lower as shown in FIG. 9 so that the actual compression ratio is held substantially constant. Therefore, the expansion ratio is also increased as the engine load becomes lower. Note that at this time as well, the throttle valve 17 is held at the full open state. Therefore the amount of intake air fed to the combustion chamber 5 is controlled not by the throttle valve 17, but by changing the closing timing of the intake valve 7.

In this way, when the engine load becomes lower than the engine high load operating state, the mechanical compression ratio is increased along with the reduction of the amount of intake air in the state where the actual compression ratio is substantially constant. That is, the volume of the combustion chamber 5 when the piston 4 reaches compression top dead center is decreased proportionally to the decrease in the amount of intake air. Therefore, the volume of the combustion chamber 5 when the piston 4 reaches compression top dead center changes in proportion to the amount of intake air. Note that, at this time, in the example which is shown in FIG. 9, the air-fuel ratio in the combustion chamber 5 becomes the stoichiometric air-fuel ratio, and therefore the volume of the combustion chamber 5 when the piston 4 reaches compression top dead center changes in proportion to the amount of fuel.

If the engine load becomes further lower, the mechanical compression ratio is further increased. If the engine load falls to the medium load L1 somewhat near low load, the mechanical compression ratio reaches the limit mechanical compression ratio corresponding to the structural limit of the combustion chamber 5 (upper limit mechanical compression ratio). If the mechanical compression ratio reaches the limit mechanical compression ratio, in the region of a lower load than the engine load L1 when the mechanical compression ratio reaches the limit mechanical compression ratio, the mechanical compression ratio is held at the limit mechanical compression ratio. Therefore, at the time of low load side engine medium load operation and at the time of engine low load operation, that is, at the engine low load operation side, the mechanical compression ratio becomes maximum and the expansion ratio also becomes maximum. Explained another way, at the engine low load operation side, the mechanical compression ratio becomes maximum so that the maximum expansion ratio is obtained.

On the other hand, in the embodiment which is shown in FIG. 9, if the engine load falls down to L1, the closing timing of the intake valve 7 becomes the limit closing timing at which the amount of intake air which is supplied to the combustion chamber 5 can be controlled. If the closing timing of the intake valve 7 reaches the limit closing timing, in the region of a lower load than the engine load L1 when the closing timing of the intake valve 7 reaches the limit closing timing, the closing timing of the intake valve 7 is held at the limit closing timing.

If the closing timing of the intake valve 7 is held at the limit closing timing, change of the closing timing of the intake valve 7 can no longer be used to control the amount of intake air. In the embodiment which is shown in FIG. 9, at that time, that is, in the region of a lower load than the load when the closing timing of the intake valve 7 reaches the limit closing timing, the throttle valve 17 is used to control the amount of intake air which is supplied to the inside of a combustion chamber 5. The opening degree of the throttle valve 17 is made smaller the lower the engine load.

On the other hand, as shown by the broken line in FIG. 9, it is possible to control the amount of intake air without relying on the throttle valve 17 if just advancing the closing timing of the intake valve 7 as the engine load becomes lower. Therefore, if expressing this to cover both the case which is shown by the solid line in FIG. 9 and the case which is shown by the broken line, in this embodiment according to the present invention, as engine load becomes lower, the closing timing of the intake valve 7 is moved in a direction away from the intake bottom dead center BDC up to the limit closing timing L1 at which the amount of intake air which is supplied to the inside of the combustion chamber can be controlled. In this way, the amount of intake air can be controlled by changing the closing timing of the intake valve 7 as shown by the solid line in FIG. 9 and can be controlled by changing it as shown by the broken line.

As explained above, in the superhigh expansion ratio cycle which is shown in FIG. 8(B), the expansion ratio is 26. The higher this expansion ratio, the better, but as will be understood from FIG. 7, even if 20 or more with respect to the practically usable lower limit actual compression ratio $\epsilon=5$, a considerably high theoretical thermal efficiency can be obtained. Therefore, in this embodiment, the variable compression ratio mechanism A is formed so that the expansion ratio becomes 20 or more.

In this regard, in a spark ignition internal combustion engine, it is required that knocking does not occur. For this reason, before forced-ignition, it is desirable to confirm that the current forced-ignition timing is not at the advanced side from the knock limit ignition timing of the current combustion cycle (forced-ignition timing when knocking starts to occur) and, if the current forced-ignition timing is at the advanced side from the knock limit ignition timing of the current combustion cycle, to control the ignition timing so as to retard the ignition timing, or set the current ignition timing based on the knock limit ignition timing of the current combustion.

To control the ignition timing so as not to allow such knocking, it is necessary to know the knock limit ignition timing of the current combustion cycle. The knock limit ignition timing changes even in general operation where the air-fuel ratio of combustion is made the stoichiometric air-fuel ratio if even one of the variable factors such as the closing timing of the intake valve or the mechanical compression ratio changes. A large number of steps are required for mapping by compliance with all variable factors by compliance tests. Further, the map becomes an extremely large multidimensional map.

Further, it is possible to control the ignition timing by predicting if knocking will occur in the current combustion cycle and retarding the ignition timing if necessary to prevent knocking. For predicting if knocking will occur, sometimes the Livingood-Wu integral shown in the following formula (2) which uses the following formula (1) to calculate the self-ignition delay time $\tau$ using the pressure and temperature inside the cylinder as variables and which considers the fact that the self-ignition delay time $\tau$ changes along with the elapse of time is employed. That is, it is assumed that self-ignition occurs in the cylinder at the time when the time integral value of the reciprocal of the ignition delay time $\tau$ (for example, the time integral value from the time of closing the intake value) becomes 1, it is predicted that knocking will not occur if the combustion is completed before the timing at which the time integral value becomes 1 (all fuel in the cylinder burns), and it is predicted that knocking will occur if the combustion is completed at the timing at which the time integral value becomes 1.

$$\tau = A \cdot P^{-n} \cdot \exp(B/T) \quad (1)$$

$$\int dt/\tau = 1 \quad (2)$$

In formula (1), A, B, and "n" are constants which are determined for each internal combustion engine, P is the cylinder internal pressure, and T is the cylinder internal temperature. In formula (2), the reciprocal of the ignition delay time $\tau_{(k)}$ at each timing from closing of the intake valve is calculated and summed until becoming 1. It is possible to predict the occurrence of knocking by whether combustion is completed before the sum becomes 1.

To calculate such a sum, massive time is required. Not only that, it is difficult to accurately estimate the cylinder internal pressure and the cylinder internal temperature at each timing after forced-ignition, and therefore it is difficult to calculate the accurate ignition delay time $\tau_{(k)}$ at each timing after forced-ignition. Due to this, it is difficult to calculate the accurate sum and realize good forced-ignition timing control.

Figure 10:
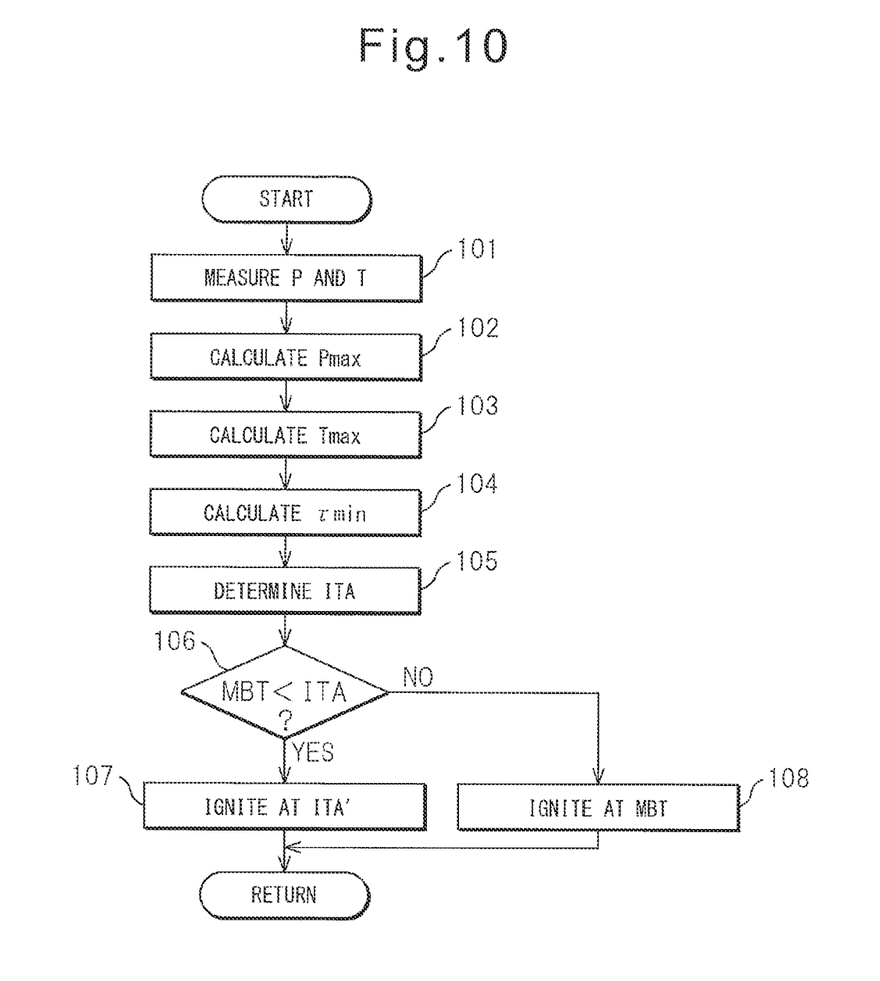
FIG. 10 is a flowchart for forced-ignition timing control.

The spark ignition internal combustion engine of the present embodiment uses the electronic control unit 30 to control the forced-ignition timing in accordance with the flow chart which is shown in FIG. 10.

First, at step 101, the cylinder internal pressure P and the cylinder internal temperature T at the time of closing the intake valve are measured. The cylinder internal pressure P and the cylinder internal temperature T may be obtained by providing a pressure sensor and a temperature sensor in the cylinder and using these sensors to measure the values at the time of closing the intake valve. Further, the cylinder internal pressure P and cylinder internal temperature T when closing the intake valve may be assumed to be the same as the intake pressure and intake temperature inside the surge tank 12, the surge tank 12 may be provided with a pressure sensor and temperature sensor, and these sensors may be used for measurement at the time of closing the intake valve (or before closing the intake valve such as when opening the intake valve). Further, the cylinder internal pressure P may be made the pressure in the surge tank 12 and mapped with respect to the opening degree of the throttle valve 17 (and engine speed). The cylinder internal temperature T may be made the outside air temperature.

Next, at step 102, the maximum cylinder internal temperature Pmax right after combustion in the case where it is assumed that equivolume combustion has been performed as the current combustion cycle is calculated by the following formula (3). "Equivolume combustion" is the ideal combustion where all fuel is instantaneously burned at compression top dead center.

$$P\max = \rho \cdot P \cdot E^k \quad (3)$$

Figure 11:
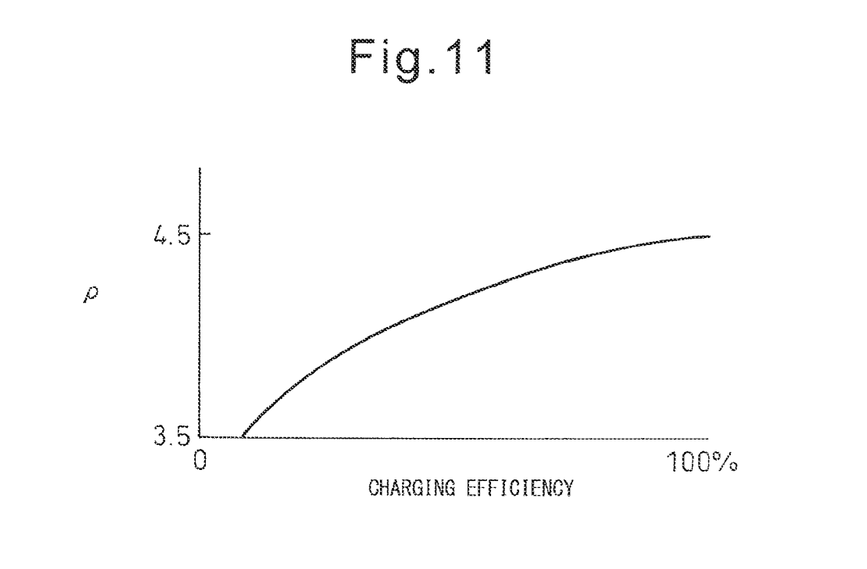
FIG. 11 is a map which shows the relationship of a charging efficiency and degree of explosion.

Here, E is the actual compression ratio, "k" is the specific heat ratio (for example, the specific heat ratio at top dead center), and $P \cdot E^k$ indicates the cylinder internal pressure at compression top dead center at the time of adiabatic compression (compression end pressure). $\rho$ is the degree of explosion. As shown in FIG. 11, it is set with respect to the charging efficiency.

Next, at step 103, the maximum cylinder internal temperature Tmax right after combustion when assuming equivolume combustion is performed as the current combustion cycle is calculated by the following formula (4).

$$T\max = \rho \cdot T \cdot E^{k-1} \quad (4)$$

Here, $T \cdot E^{k-1}$ indicates the cylinder internal temperature at compression top dead center at the time of adiabatic compression (compression end temperature). If multiplying the compression end pressure $P \cdot E^k$ with the degree of explosion $\rho$ in this way, it is possible to calculate the maximum cylinder internal pressure Pmax right after equivolume combustion, while if multiplying the compression end temperature $T \cdot E^{k-1}$ with the degree of explosion $\rho$, it is possible to calculate the maximum cylinder internal temperature Tmax right after equivolume combustion.

Further, the actual compression ratio E, as explained above, can be calculated from the combustion chamber volume of the current top dead center and the actual stroke volume from the time of closing of the intake valve. However, strictly speaking, right before closing the intake valve, the opening area of the intake port becomes smaller, the intake air in the cylinder can no longer be blown back to the intake port, and compression is substantially started, and therefore the stroke volume from right before closing the intake valve is preferably made the actual stroke volume.

Next, at step 104, the shortest self-ignition delay time τmin for the maximum cylinder internal pressure Pmax and the maximum cylinder internal temperature Tmax is calculated by the following formula (5).

$$\tau\min = A \cdot P\max^{-n} \cdot \exp(B/T\max) \cdot C \quad (5)$$

Here, A, B, and "n", as explained above, are constants determined for each internal combustion engine. C will be explained later.

Figure 12:
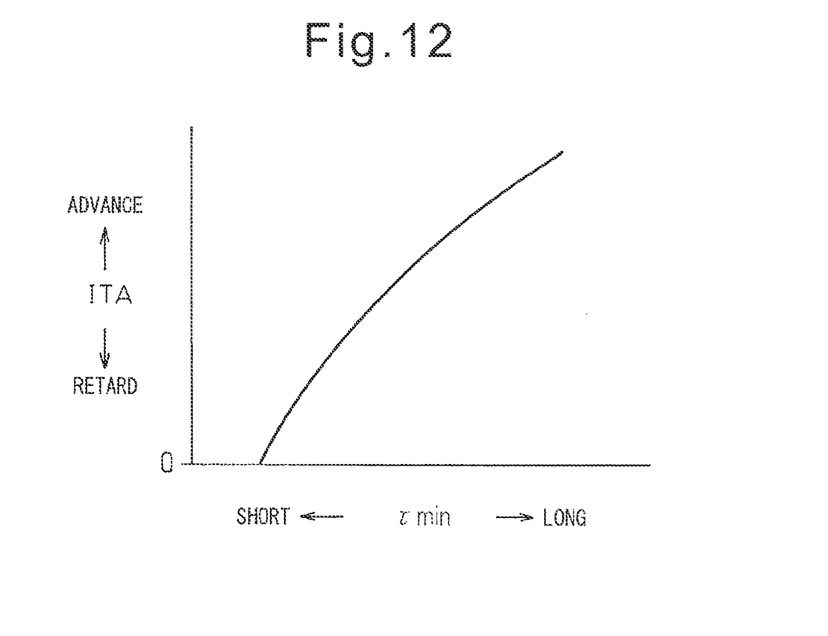
FIG. 12 is a map which shows the relationship between a shortest self-ignition delay time and a knock limit forced-ignition timing.

The shortest self-ignition delay time τmin calculated in this way with respect to the maximum cylinder internal pressure Pmax and the maximum cylinder internal temperature Tmax when equivolume combustion is performed is a value which includes the amount of intake air, the actual compression ratio E, and all other variable factors and which indicates the ease of occurrence of knocking in the current combustion cycle. The shorter the shortest self-ignition delay time τmin, the easier it is for knocking to occur. Due to this, it is possible to advance the knock limit forced-ignition timing ITA the longer the shortest self-ignition delay time τmin and possible to set the knock limit forced-ignition timing ITA with respect to the shortest ignition delay time τmin by a compliance test as shown in FIG. 12. ITA is the crank angle before compression top dead center. 0 degree indicates compression top dead center.

In this way, at step 105, the knock limit ignition timing ITA is determined based on the calculated shortest ignition delay time τmin and by using the map of FIG. 12.

Next, at step 106, it is judged if the optimum forced-ignition timing MBT (Minimum Spark Advance for Best Torque) which is set at the time of the current combustion cycle is at the advanced side from the knock limit ignition timing ITA. If the judgment is NO, knocking will not occur even if the ignition timing is MBT. At step 108, ignition is performed at the MBT.

On the other hand, if the judgment at step 106 is YES, that is, when the set MBT is at the advanced side from the knock limit forced-ignition timing, knocking will occur by forced-ignition at the MBT, and therefore at step 107, the ignition is performed at the ignition timing ITA' at the slightly retarded side from the knock limit forced-ignition timing ITA. In this way, good ignition timing control not allowing knocking becomes possible.

In this regard, C in the above formula (5) is a correction coefficient for lengthening the shortest self-ignition delay time τmin the smaller the combustion chamber volume at compression top dead center by the variable compression ratio mechanism A for control of the mechanical compression ratio. The smaller the combustion chamber volume at compression top dead center, the greater the change in the combustion chamber volume per unit time of the expansion stroke, and therefore at the expansion stroke, the cylinder internal pressure and cylinder internal temperature rapidly fall and knocking becomes difficult to occur.

Due to this, for example, if designating the combustion chamber volume of compression top dead center when the mechanical compression ratio is set the lowest (maximum combustion chamber volume of compression top dead center) (see FIG. 3(A)) as Vmax and designating the combustion chamber volume of the current compression top dead center as V, it is possible to set the correction coefficient $C=d1 \cdot Vmax/V$. d1 is a weighting coefficient corresponding to the degree of influence of such a change in combustion chamber volume. Further, even if the engine speed is high, the change in the combustion chamber volume per unit time of the expansion stroke becomes larger, and therefore if designating the idle speed as Nmin and the current engine speed as N, a correction coefficient of $C=d2 \cdot (Vmax/V) \cdot (N/Nmin)$ is also possible. d2 is a weighting coefficient which corresponds to the degree of influence of the change in the combustion chamber volume.

At step 105, if correcting the shortest self-ignition delay time τmin, which shows the ease of occurrence of knocking, by such a correction coefficient C before determining the knock limit forced-ignition timing ITA, it is possible to determine the more suitable knock limit forced-ignition timing ITA for the current combustion cycle.

REFERENCE SIGNS LIST

A variable compression ratio mechanism
30 electronic control unit

The invention claimed is:

1. A spark ignition internal combustion engine comprising a control unit for controlling forced-ignition timing,
   wherein the control unit is configured to:
   calculate a shortest self-ignition delay time by assigning a maximum cylinder internal pressure and maximum cylinder internal temperature during theoretical equivolume combustion, to a calculation formula which uses a cylinder internal pressure and a cylinder internal temperature to calculate a self-ignition delay time;
   determine a knock limit forced-ignition timing based on the calculated shortest self-ignition delay time; and
   control the forced-ignition timing of the engine based on a result of the knock limit forced-ignition timing determination.

2. The spark ignition internal combustion engine as set forth in claim 1, wherein the control unit is further configured to perform correction before determining said knock limit forced-ignition timing so that the smaller a combustion chamber volume at compression top dead center by a variable compression ratio mechanism, the longer the shortest self-ignition delay time.

* * * * *